United States Patent [19]

Alexander et al.

[11] Patent Number: 5,497,456
[45] Date of Patent: Mar. 5, 1996

[54] APPARATUS FOR TRANSFERRING INFORMATION BETWEEN AN INTERRUPT PRODUCER AND AN INTERRUPT SERVICE ENVIRONMENT

[75] Inventors: James W. Alexander, Hillsboro, Oreg.; Elliot Garbus, Tempe, Ariz.; Lionel S. Smith, Jr., Higley, Ariz.; Douglas D. Yoder, Phoenix, Ariz.

[73] Assignee: Intel Corporation, Santa Clara, Calif.

[21] Appl. No.: 404,136

[22] Filed: Mar. 13, 1995

Related U.S. Application Data

[63] Continuation of Ser. No. 999,387, Dec. 31, 1992, abandoned.

[51] Int. Cl.$^6$ .................................................. G06F 11/34
[52] U.S. Cl. ................ 395/183.05; 395/500; 364/232.3; 364/DIG. 1
[58] Field of Search .................................. 371/15.1, 16.2; 395/575, 500, 183.04, 183.05; 364/232.3, 232.23

[56] References Cited

U.S. PATENT DOCUMENTS

| | | | |
|---|---|---|---|
| 4,785,416 | 11/1988 | Stringer | 364/200 |
| 4,789,924 | 12/1988 | Fukuta | 364/200 |
| 4,796,258 | 1/1989 | Boyce et al. | 371/16.1 |
| 4,992,934 | 2/1991 | Portanova et al. | 364/200 |
| 4,993,027 | 2/1991 | McGraw et al. | 371/16.2 |
| 4,998,197 | 3/1991 | Kurakazu et al. | 364/200 |
| 5,056,013 | 10/1991 | Yamamoto | 364/200 |
| 5,077,657 | 12/1991 | Cooper et al. | 395/500 |
| 5,136,590 | 8/1992 | Polstra et al. | 371/16.2 |
| 5,202,976 | 4/1993 | Hansen et al. | 395/500 |
| 5,226,047 | 7/1993 | Catlin | 371/16.2 |
| 5,321,828 | 6/1994 | Phillips et al. | 395/500 |

FOREIGN PATENT DOCUMENTS

237846  9/1989  Japan .............................. G06F 11/28

*Primary Examiner*—Robert W. Beausoliel, Jr.
*Assistant Examiner*—Albert Decady
*Attorney, Agent, or Firm*—Owen L. Lamb

[57] ABSTRACT

A micro processor emulator in which a set of core micro processor registers are the communication interface between an external system and a core-ported memory. The registers are connected to a serial scan port for transfer of information between a halted emulation environment and the external system. The serial port includes a command register that receives a jump address to initiate execution of a software monitor. Two special bits are provided in the command register, one that indicates a break, and one that indicates a Fast Break GO. This provides a break mechanism for a micro processor chip which does not have a dedicated memory bus. This break mechanism is the mechanism by which a halt or an asynchronous break is effected. After a fast break, the Fast Break GO mechanism does the action described by one command, and then immediately goes back to emulation without any external processor intervention.

15 Claims, 5 Drawing Sheets

APPARATUS FOR TRANSFERRING INFORMATION BETWEEN AN INTERRUPT PRODUCER AND AN INTERRUPT SERVICE ENVIRONMENT

This is a continuation of application Ser. No. 07/999,387 filed Dec. 31, 1992, now abandoned.

CROSS-REFERENCE TO RELATED APPLICATIONS

Patent application Ser. No. 07/985,563 entitled "A Microprocessor Emulator Having Time-encoded Break Control Over Several Events" of James W. Alexander, et al. filed Dec. 3, 1992; and, patent application Ser. No. 07/996,036, now U.S. Pat. No. 5,383,192, granted Jan. 17, 1995 entitled "Method and Means for No-slip Recognition in a Microprocessor Emulator" of James W. Alexander, et al. filed Dec. 23, 1992, both assigned to Intel Corporation, the assignee of the present invention.

BACKGROUND OF THE INVENTION

1. Field of the Invention

The present invention is related to data processing systems and more specifically, to an in-circuit emulator for transferring information between an interrupt producer and an interrupt service environment.

2. Prior Art

An in-circuit emulator (ICE) duplicates and imitates the behavior of a chip it emulates by using programming techniques and special machine features to permit the ICE to execute micro code written for the chip that it imitates.

Because input/output pins are limited, transfer of commands, data, and status information between the emulator and an external system must be done by means of a serial interface.

In the prior art, an emulation processor operates in two execution modes, emulation mode and interrogation mode. Emulation mode is the mode of the emulator which includes real-time event evaluation. Interrogation mode is an interrupt service environment of the emulator. A monitor that is emulation processor code executed during interrogation mode is provided. A break occurs to exit emulation mode to enter interrogation mode and thus invoke the monitor.

Copending patent application Ser. No. 07/985,563 provides an ICE apparatus that will control a number of on-chip break mechanisms externally using only a single input pin. The emulator includes an instruction pointer counter (IP counter) and a break logic connected to the IP counter. The break logic has an arm input and is capable of matching the IP counter to an instruction execution address. Once a cluster is armed by the sequencer, an IP match from the IP marchers that occurs after the cluster is armed results in a break and the emulation stops immediately.

Patent application Ser. No. 07/996,036, now U.S. Pat. No. 5,383,192, granted Jan. 17, 1995 provides an in-circuit emulator that prevents slip between the time a break event occurs and an arm signal arms the emulator to detect the break.

A patch is one or more program statements added to correct code. During emulation mode an interrupt producer (control processor) may perform patching of the monitor code. In the prior art, while the interrupt producer is performing large numbers of monitor patches wait states must be introduced into monitor execution, while the emulation processor is in emulation mode, and a break occurs before the interrupt producer is finished. Since both agents cannot service memory simultaneously, wait states are introduced to cause the emulator to go to a halt state until the interrupt producer is finished patching up the monitor.

It is therefore an object of the present invention to provide a method and apparatus for transferring information between an interrupt producer and an interrupt service environment without inducing wait states.

SUMMARY OF THE INVENTION

Briefly, the above object is accomplished in accordance with the invention by providing a micro processor emulator operable in an interrogation mode and an emulation mode, said micro processor emulator including a test ROM and a memory. Executable code is provided starting at a predetermined ROM address of said test ROM, said code executing at least a first command and a next command, said first command and said next command being executable in said interrogation mode. Serially received information is registered including a jump address to said predetermined ROM address to start execution of said executable code, said information including a command, said command including a first bit. Means are provided for sequentially executing said commands. Said first bit is polled during said interrogation mode. Said emulation mode is entered after execution of said first command upon the condition that said first bit is asserted, and execution of said next command is effected upon the condition that said first bit is unasserted.

In accordance with an aspect of the invention, An action specified by one command is performed in said second interrogation mode and then a return is made to emulation mode from said second interrogation mode.

The invention has the advantage that a mechanism ensures that the monitor will reenter emulation mode after executing only one command, thus providing a fast break without inducing wait states.

The foregoing and other objects, features, and advantages of the invention will be apparent from the following more particular description of a preferred embodiment of the invention as illustrated in the accompanying drawings.

DESCRIPTION OF THE PREFERRED EMBODIMENT

The IEEE Joint Test Action Group (JTAG) has issued IEEE Standard 1149.1 which is a specification for a 5-wire serial scan bus. In the present invention, the serial scan bus is used with a test access port for the software of a reduced instruction set monitor (RISM). The RISM performs primitive functions of a debug monitor: hardware data type reads and writes, break and go. Four instructions are dedicated to in-circuit emulator (ICE) functions: RISM input, RISM output, CONTROL input and STATUS output. The port includes an 8-bit JTAG command register ported to a processor core as a 24-bit indirect jump register, an 8-bit status register ported to the processor and to JTAG, a 24-bit address register ported to the processor and JTAG, and a 32-bit bidirectional data register ported to the processor and JTAG.

The RISM registers are the communication interface between the external system and the core-ported memory. They transfer information between a halted emulation environment and the JTAG port. The data are shifted in by shifting in Bit 0 first. The command register has six bits that tell which address to execute in the RISM. Two special bits are provided, one that indicates a break, and one that indicates a Fast Break GO. This is a break mechanism for a chip which does not have a dedicated memory bus. So this is the mechanism by which one does a halt or an asynchronous break to enter fast or permanent interrogation mode. The Fast Break GO mechanism allows only one monitor command after break and then immediately goes back to emulation without any external processor intervention. Fast and permanent interrogation modes are more fully described in the above identified application Ser. No. 07/985,563.

Registers

Figure 1:
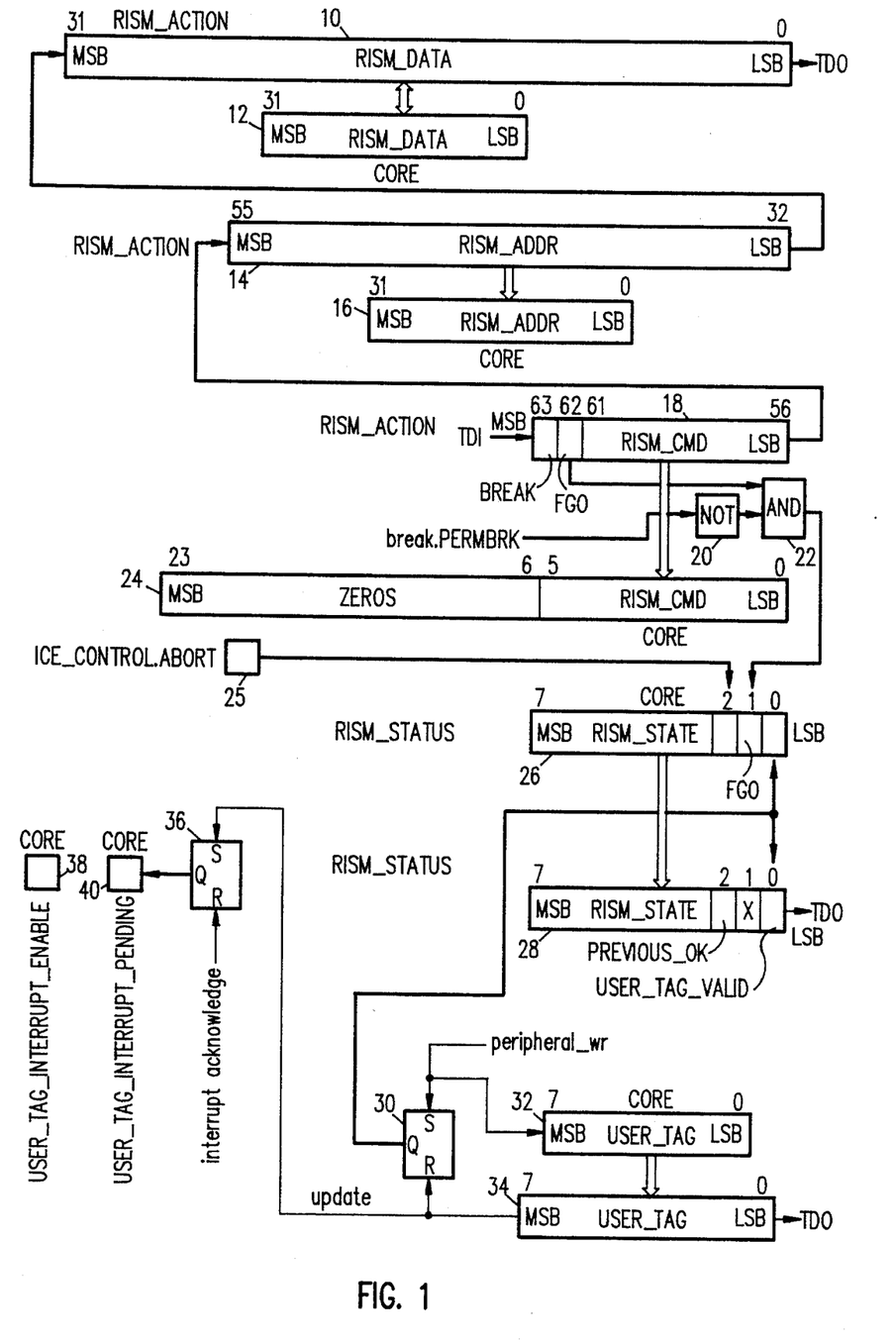
FIG. 1 is a block diagram of communication registers of a microprocessor emulator in which the present invention is embodied.

In FIG. 1 two types of registers are shown, the core registers which reside in the microprocessor chip and the JTAG registers which provide the JTAG interface. The JTAG and core clocks are asynchronous. An arbitration mechanism is provided so that multiple bit changes to registers of one agent (core or JTAG) are correctly transferred to the other agent (JTAG or core). Each register is accessed by a different instruction, represented by the register name.

The ICE control abort (25) is used as a status bit to the RISM to tell it to write the core RISM_CMD register with an idle command. This is used to protect against a sliver condition which may occur while aborting a fast break.

JTAG Registers

The RISM data register (10) is used to exchange values with the RISM and is interpreted by the RISM. The RISM_ADDR register (14) contains the address of the contents of the RISM_DATA register (10) and is also interpreted by the RISM. The RISM_CMD register (18) contains the command to operate on the RISM_DATA register (10) and the RISM_ADDR register (14). The RISM_CMD register is interpreted by the RISM_MONITOR. This register is written in emulation during ICE reset any time after break before completion of the first non idle command in interrogation; after RISM_STATE is changed after completion of the first command in interrogation; or when the trace bus RISM busy signal is inactive. This register can contain a command to jump to another RISM-compatible code fragment. The FGO bit of the RISM_CMD register (18) causes entry into emulation after completion of one non idle RISM command. The use of this bit is limited to fast breaks since a permanent break will prevent this bit from appearing asserted in the core RISM_STATE register (26). This mechanism prevents a fast break RISM command accompanied by an asserted RISM_ACTION FGO bit from initiating a reentry into emulation instead of jumping to the idle loop. A RISM command is provided in order to initiate a GO during permanent break.

The break bit in the RISM_CMD register (18) when set causes a break during emulation. For single-command fast breaks, the break and FGO bits are set in the same RISM action update operation. The user tag valid bit is asserted when the core user tag register (32) is written. It is deasserted when the JTAG user tag register (34) is updated. This bit is polled during emulation to determine when it is asserted. At that point the JTAG user tag is read which will deassert the user tag valid bit through the circuit (30).

The previous OK bit of the RISM_STATE register (28) is asserted when the previous update of the JTAG RISM status register was not coincident with a core write to the RISM status register. When deasserted, it was because a core write to the RISM status register was coincident with the previous JTAG capture of RISM status. If this bit is zero, then the previous RISM_STATUS.RISM_STATES are ignored. A zero indicates that RISM_STATE may have been transferred incoherently from the core to the JTAG registers due to a timing violation caused by coincident core write and JTAG capture. This bit is zero during the first two captures after a JTAG reset. The value of this bit is generated on the previous RISM_STATUS capture.

The RISM_STATE register (28) is written from the core RISM_STATE register (26). This register is polled during execution of a RISM command. The completion of a command is indicated when a change in this register is detected.

The JTAG user tag register (34) is written through from the core user-tag register (32) while the user tag bit of the RISM_STATE register (28) is deasserted. This register is used to pass data from emulation without resorting to a fast break. It is read during emulation after detecting an asserted user tag valid bit.

Core Registers

The core registers shown in FIG. 1 will now be described. The core RISM_DATA register (12) is used to exchange values with the RISM and the contents are interpreted by the RISM. If the RISM is busy and the RISM status register has not been written, then the RISM communication handshake field of the trace bus is changed to one as illustrated in FIG. 4.

The core RISM_ADDR register (16) is updated from the JTAG RISM_ADDR register (14) to contain the address contents of RISM data (12).

The core RISM_CMD register (24) is updated by a write from the JTAG RISM CMD register (18). This is a command to operate on the RISM_DATA register (12) and the RISM address register (16). The bits 23:6 are not writable and are set to zero. The RISM writes this register with an idle command after completion of each command. RISM writes to the RISM_CMD register are blocked after the update through from JTAG to RISM_CMD until the core RISM_CMD register has been read by the RISM. This prevents the idle command written by the monitor from overwriting the next command from JTAG.

Figure 4:
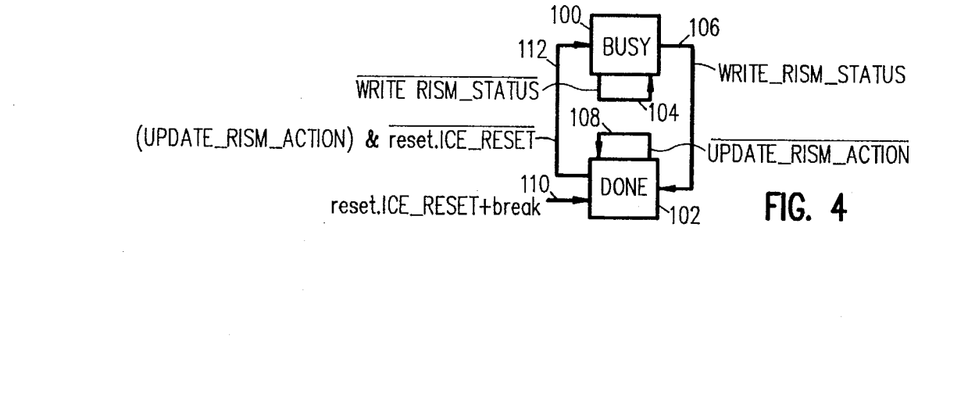
FIG. 4 is a state diagram of the RISM communication handshake mechanism.

If the core RISM_STATUS register (26) is written while the RISM is busy, then the RISM communication handshake field of the trace bus is changed to zero as shown in FIG. 4. The user tag valid bit when set means that the core user tag register should not accept writes. When not set, it means that the core user tag may be written. The interrupt generated by deassertion of this bit is used during emulation to load a new value into the core user tag register. The RISM_STATE field of the core RISM_STATUS register (26) is changed by the RISM after completion of every command.

The core user-tag register (32) is used as an interrupt-driven buffer. When written, it sets the user tag valid bit. Two more bits are required for user tag, the interrupt enable bit (38) and the interrupt pending bit (40).

Reduced Instruction Set Monitor (RISM)

The RISM is located in test ROM and is executed in interrogation mode. The RISM is used by both the ICE and an evaluation board.

The RISM registers are the communication interface between the outside world and readable/writable core-ported memory resources. Flash programming routines located elsewhere in test ROM are executable by the RISM during permanent interrogation. Flash programming routines not accessible from test ROM are executable during permanent interrogation from internal code RAM. All RISM registers are located such that they are accessible through a single vertical window setting.

The Instruction Pointer (IP) and Program Status Byte (PSB) are saved at break. The RISM also saves the effective address (EA) and both of the WSR registers. The saved versions of these registers are called their images. Changes to the imaged registers are made to their images rather than to the registers themselves because either the monitor is using them temporarily (WSRs, EA), or they are only accessible through special mechanisms (IP, PSB).

The JTAG RISM_STATUS register (28) may be polled to determine command completion and state transitions:

(a) Bits [7:6] are incremented by the RISM after break, during go, and after each other non-idle command. These are the sequence bits.

(b) Bit [5] is one during interrogation and is zero during emulation. This is the stopped bit.

(c) Bit [4] is one during in-progress flash programming and is zero when flash programming is not in progress. All writes and flash-array accesses shall be ignored when bit [4] is one. This is the flash_busy bit.

(d) If flash is busy and the core FGO bit is set, the monitor reenters emulation without executing the command.

(e) Done executes go if the FGO bit of core RISM STATUS is set. Core RISM_STATUS.FGO is set if JTAG RISM_STATUS.FGO is set and there are no permanent break causes.

The PREVIOUS_OK bit of the JTAG RISM_STATUS register does not reflect the current RISM_STATUS-.RISM_STATE (upper five bits of RISM_STATUS). Instead, it indicates the validity of the previous RISM_STATUS.RISM_STATE. The previously captured RISM_STATUS.RISM_STATE is ignored when PREVIOUS_OK bit is zero. The PREVIOUS_OK bit is zero for the first two captures after JTAG reset.

The JTAG RISM_ACTION register is not captured until notification (either on the trace bus or through the JTAG RISM_STATUS register) of previous command completion. Notification of first command completion after break is obtained from the RISM_STATUS register, even if the trace bus is used normally.

The zero register is not writable in emulation, but may be written in interrogation. dsp_temp resides in the zero register. The WSR images reside in the 0FFFFH register. Go initializes the zero and the 0FFFFH registers to their reset values before entering emulation.

Upon termination of the interrogation process (go), the IRET instruction restores the IP and PSB, and the first instruction in emulation is executed.

RISM_CMD is initialized prior to invocation after ICE reset.

Access to all registers is accomplished through individual RISM routines which read or write a byte, word, long, or dsp. This includes accesses to images and the RISM registers themselves.

Imaged registers should not be accessed. Because results of RISM execution of commands which change the imaged registers themselves may be unpredictable, access is made to the images instead of the imaged registers.

Write data are right-justified in the RISM_ACTION-.RISM_DATA bit partition (10). Read data are also right-justified. A jump instruction operates on the RISM_CMD register (18), so the content of the RISM_CMD register is a code address. Only certain ones work right, however; namely those corresponding to the following RISM labels:

| Address | Label | Description |
| --- | --- | --- |
| 2CH | idle | initial RISM_CMD value after ICE reset |
| 34H | read_byte | read a byte |
| 3CH | read_word | read a word |
| 44H | read_long | read a long |
| 4CH | write_byte | write a byte |
| 54H | write_word | write a word |
| 5CH | write_long | write a long |
| 64H | read_dsp | read DSP accumulator and controls |
| 70H | write_dsp | write DSP accumulator value |
| 84H | write_dsp_ctrl | write DSP accumulator value and controls |
| 90H | call_other | call another RISM-compatible function |
| A8H | execute_other | jump to another RISM-compatible code fragment |
| B0H | go | enter emulation |
| FCH | RISM_prog | special version of call_other which programs flash |

Execute_other and call_other are expansion commands. They allow RISM-compatible yet-to-be-written code fragments to be executed. Since the 24-bit RISM_address register contains an indirect jump address, any resource may be used, e.g., to bolt a flash programming algorithm into internal code RAM: dig out the user's code there, write the algorithm there, program flash, and then put it back, using just the commands provided in the RISM.

The following table provides the definitions of RISM register contents for each command:

| LABEL | RISM_ADDRESS | RISM_DATA input | RISM_DATA output |
| --- | --- | --- | --- |
| idle | x | x | x |
| read_byte | byte pointer | x | [7:0] |
| read_word | word pointer | x | [15:0] |
| read_long | long pointer | x | [31:0] |
| write_byte | byte pointer | [7:0] | x |

| LABEL | RISM_ADDRESS | RISM_DATA input | RISM_DATA output |
|---|---|---|---|
| write_word | word pointer | [15:0] | x |
| write_long | long pointer | [31:0] | x |
| read_dsp | x | x | dsp[31:0](NOTE 1) |
| write_dsp | [7:0 = dsp[39:32]] | dsp(31:0) | x |
| write_dsp_ctrl | [15:0 = dsp[47:32]] | dsp(31:0) | x |
| call_other | execution address | used defined | user defined |
| execute_other | execution address | user defined | user defined |
| go | x | x | x |
| RISM_prog | long pointer | (31:] | x |

NOTE 1: dsp[39:32] remain in dsp_temp (address 0).

Test ROM Interface

Execute_other allows RISM-compatible test ROM routines to be executed. These routines simulate calls and returns using sequences of other instructions when invoked from the RISM. These routines execute normal calls and returns when invoked during emulation.

The test ROM routines are invoked with an ICALL from emulation, but the test ROM routines are invoked by a simulated ECALL from the RISM. So the IRET which terminates a test ROM routine is coded as a simulated ERET for invocation from RISM.

Prior to test ROM routine invocation from RISM, the following on-chip resources are saved off-chip. After completion of the test ROM routine, these same on-chip resources are restored from off-chip.

(a) Register locations 0 through 3 and 8 through 0DH.

(b) The ASP register.

(c) The amount of active stack required by the test ROM routine and all of its nested calls.

Prior to test ROM routine invocation from RISM, the zero register at address 0 and the 0FFFFH register at address 0CH are written to their normal values and the ASP register is set so that the stack resides within a writable on-chip resource. Registers 0 through 3 and 8 through 0BH are required by the test ROM routines to simulate stack instructions.

RISM_status.stopped is the test ROM flag to determine if calls and returns shall be simulated. Upon invocation by the RISM, RISM_status.stopped is equal to one. which is used by the test ROM routines to determine that calls, pushes, pops, and returns should be simulated. Upon invocation during emulation, RISM_status.stopped is equal to zero. which is used by the test ROM routines to determine that normal calls, pushes, pops, and returns should be executed.

The simulated calls and returns make heavy use of the Effective Address (EA) register, but the sequences need not be protected because they are only executed in interrogation mode, which is not interruptable.

Digital Signal Processor (DSP) Interface

Three DSP access commands are provided:

(a) read_dsp. This command reads the 38 dsp value bits and the 3 control bits DL1, DL0, and SUS. The lower 32 bits of the value are stored in RISM_DATA. The upper 6 bits of the value and the 3 control bits are stored in the word at dsp_temp (address 0). To read the DSP using fast breaks, a read_dsp command is executed followed by a word read of dsp_temp.

(b) write_dsp_ctrl. This command writes the 38 dsp value bits and the 3 control bits DL1, DL0, and SUS. The lower 32 bits of the value are stored in RISM_ DATA. The upper 6 bits of the value and the 3 control bits are stored in RISM_ADDR.

(c) writea_dsp. This command writes the 38 dsp value bits only. The 3 control bits are retained. The lower 32 bits of the value are stored in RISM_DATA. The upper 6 bits of the value are stored in RISM_ADDR.

The format of RISM_ADDR and dsp_temp adheres to the format specified for the Idacnt instruction. The format of RISM_DATA adheres to the format specified for the Idaccl instruction.

Handshake

Refer to FIG. 4. The trace bus TBLE becomes the RISM communication handshake signal during interrogation:

(a) TBLE=0 when the RISM has finished the command, done state (102). This code is asserted when the RISM is busy (100) and then the core writes (106) to the RISM_STATUS register. This code is asserted after ICE reset.

(b) TBLE=1 when the RISM is working on a command, busy state (100). This code is asserted when the JTAG RISM_ACTION register is updated (112).

In FIG. 1, the fast-break core bit (FGO) is cleared if a permanent request caused the break. Thus, if the BREAK-.PERMBRK line is inactive, then the AND circuit (22) is energized by the NOT circuit (20). This allows the FGO bit from the register (18) of the JTAG interface to set the FGO bit of the core state register (26). On the other hand, if the PERMBRK line is active, then the AND circuit (22) is disenergized and the FGO bit is reset.

Interrogation mode allows the user to assume complete control of the target environment. The RISM and the JTAG register mechanisms facilitate this interaction. As described in the above-identified application Ser. No. 07/985,563, interrogation transpires from ICE reset until GO, and from BREAK until GO. The user tag register (32) provides an intrusive communication port between an emulating user process and an external debugger through the JTAG interface user tag register (34).

Figure 2:
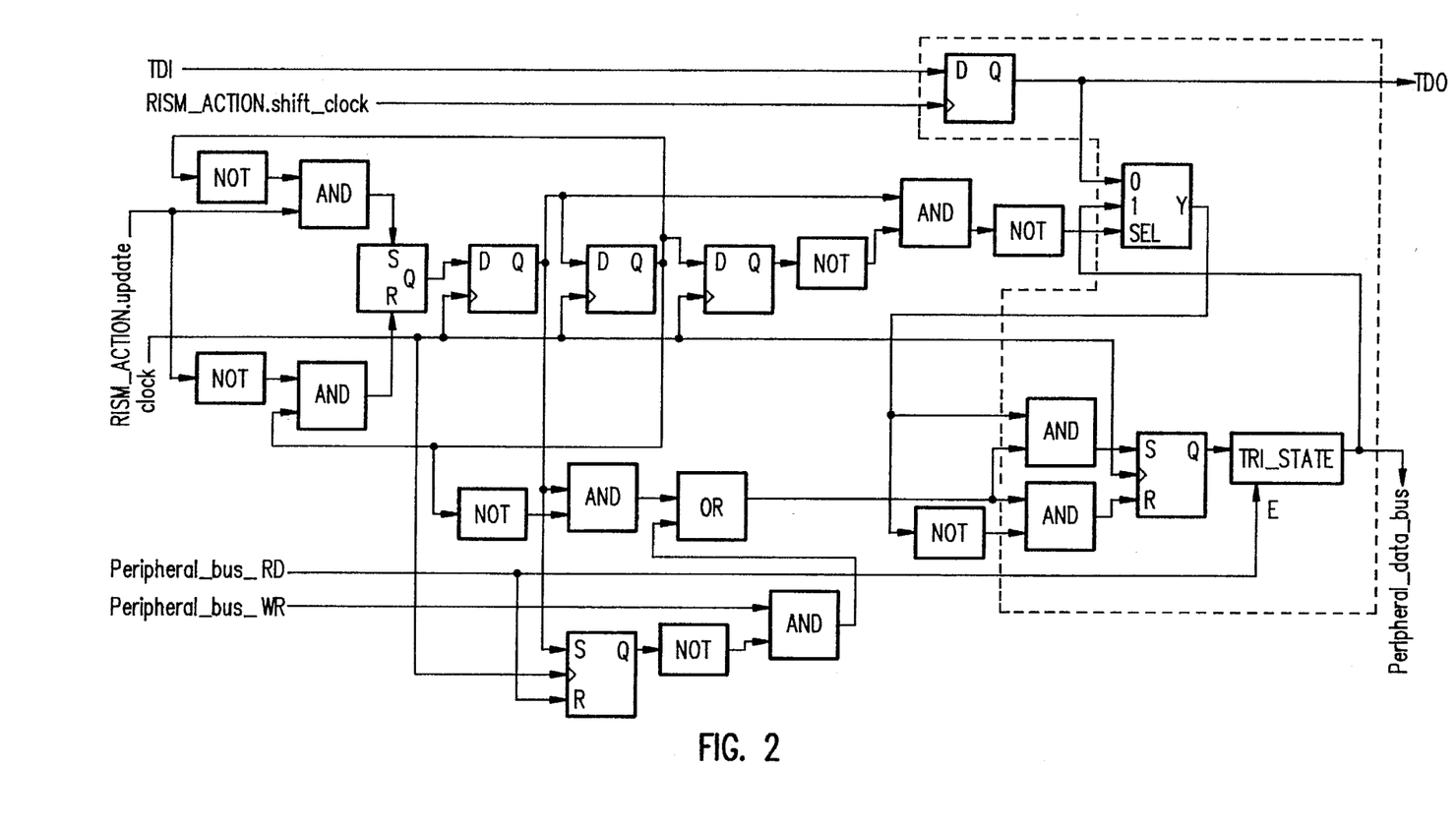
FIG. 2 is a block diagram of the RISM_CMD register shown in FIG. 1.

Refer now to FIG. 2. The logic within the dotted lines is replicated for each of the 8 bits in the RISM_ACTION-.RISM_CMD register (18). A command, such as a GO command, is loaded into the JTAG RISM action register. The core RISM_CMD register is then loaded from the register (18) by energizing the RISM action update line. The RISM then executes the GO command and enters emulation.

Figure 3:
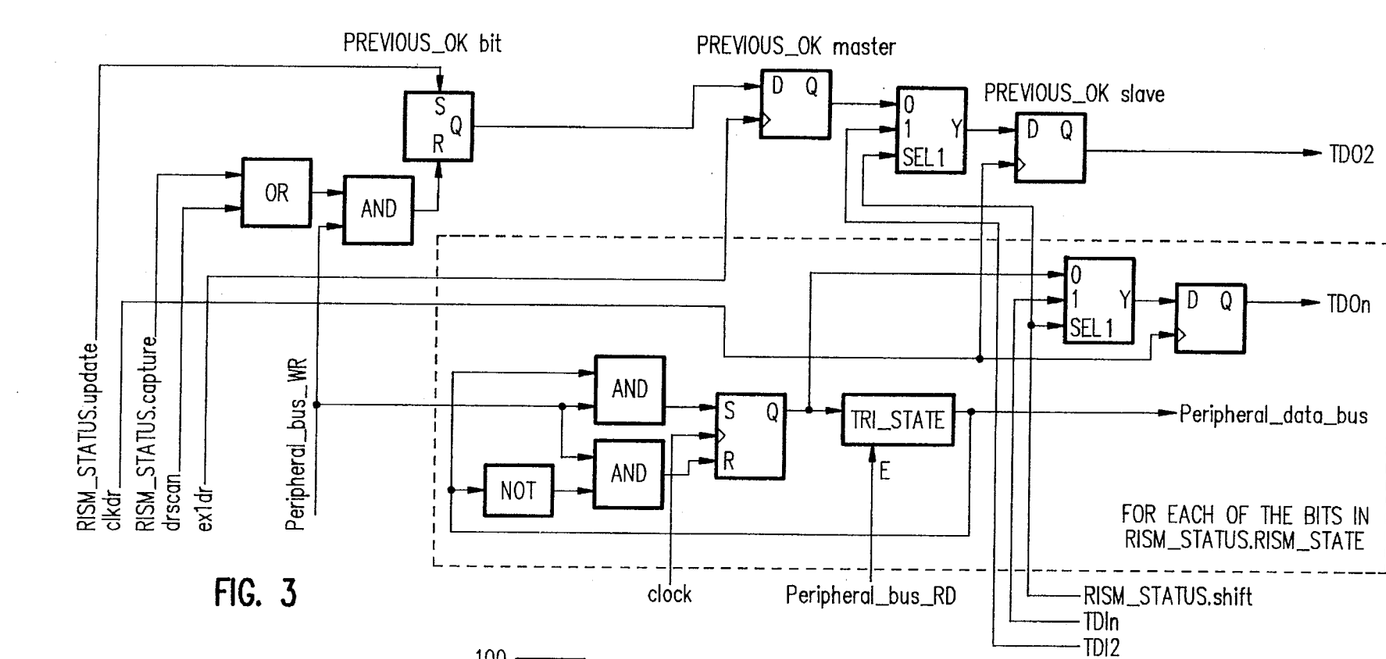
FIG. 3 is a block diagram of the RISM_STATE register shown in FIG. 1.

Refer now to FIG. 3. The logic within the dotted lines is replicated for each of the 8 bits in RISM_STATUS.RISM_ STATE.

Flow Diagram of Break to Interrogation

Figure 5:
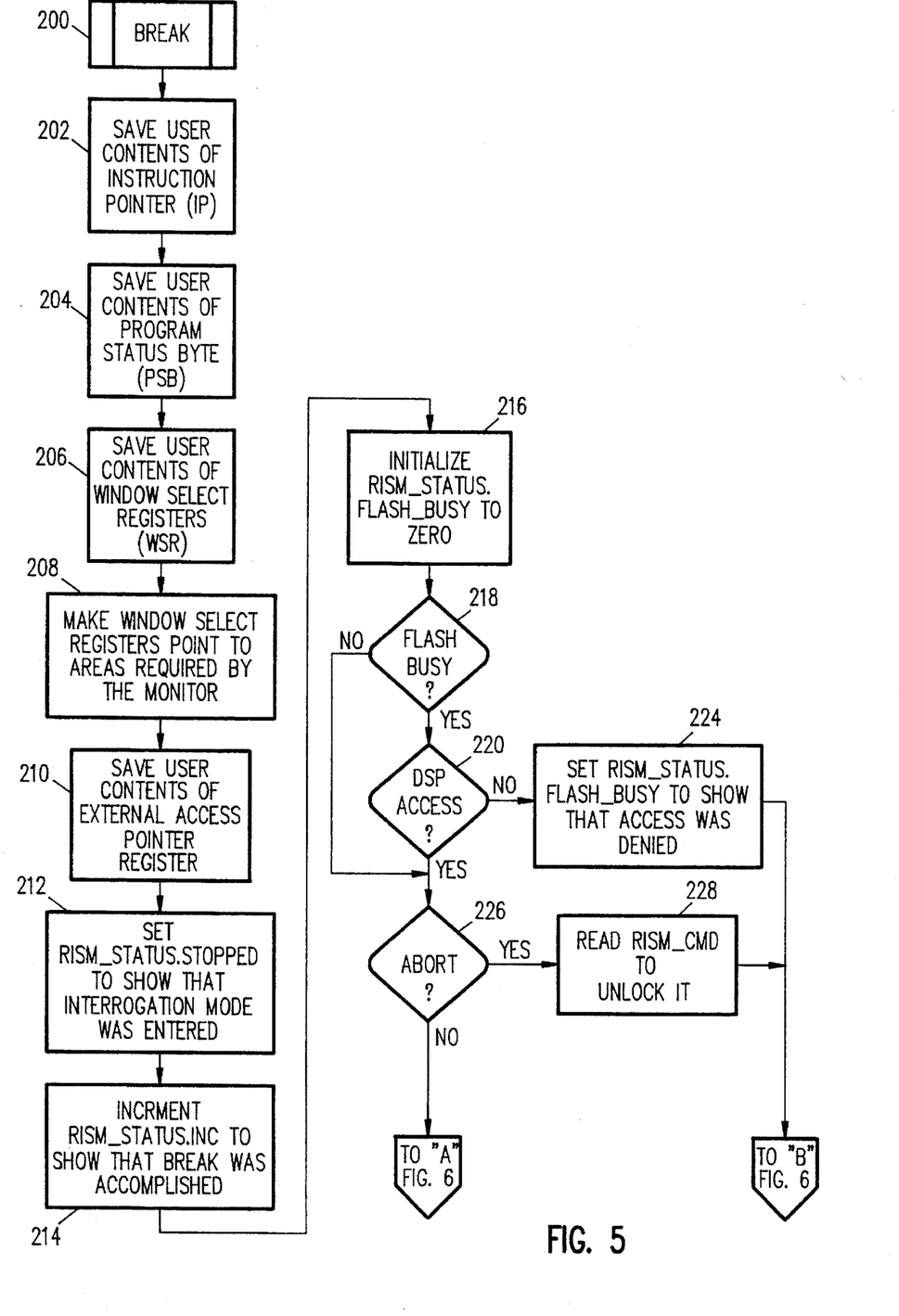
FIGS. 5 and 6 are flow diagrams of the operation of the logic shown in FIG. 1.
Figure 6:
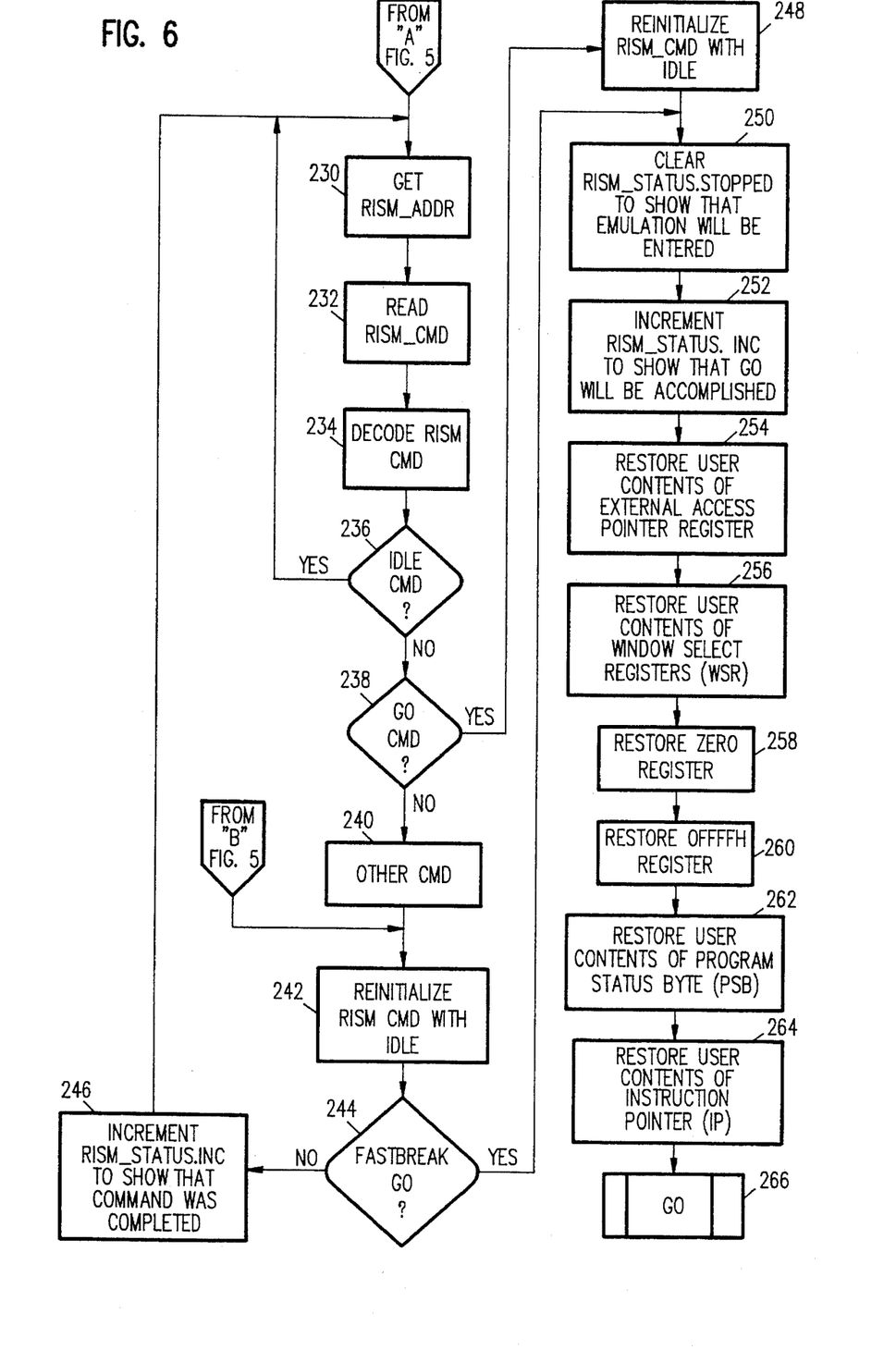

Refer to FIGS. 5 and 6 which are flow diagrams of BREAK (200), FIG. 5, to enter interrogation mode and a return to emulation mode via GO (266), FIG. 6.

After a break occurs (200), the contents of the IP, PSB, and WSR are saved (202–206) and the WSR is made to point to areas required by the monitor (208). Status is set to indicate interrogation mode (212) and to show that break was accomplished (214). A test is made to see if flash is busy (218). If the flash array is busy and the core FGO bit is set, the monitor reenters emulation without executing the command (224).

If the flash array is not busy, and if the operation is not aborted (226), the flow proceeds to FIG. 6. The command address is obtained, the command is read and the command is decoded (230–234). An idle command (236) will cause a return to get the next command. A GO command (238) changes status in preparation for reentering emulation mode (250, 252), restores the registers that were saved (254–264) and goes back to emulation mode (266).

If neither a GO command or an IDLE command is decoded (240), then the RISM_CMD register is reinitialized with an IDLE command. Thus, after a fast break (244), the Fast Break GO mechanism does the action described by the one command (250–264), and then immediately goes back to emulation (266) without any external processor intervention. If no fast break (244) occurs, then the status is changed to show that the command was completed and the flow returns to get the next command (230).

While the invention has been particularly shown and described with reference to preferred embodiments thereof, it will be understood by those skilled in the art that the foregoing and other changes in form and detail may be made therein without departing from the scope of the invention.

What is claimed is:

1. An emulation processor operable in an interrogation mode and an emulation mode, said micro processor emulator including a test ROM and a memory, said emulation processor comprising:

first means for providing code executable starting at a predetermined ROM address of said test ROM, said code including at least a first command and a next command, said first command and said next command being executable in said interrogation mode;

second means for registering serially received information;

said second means including a command register and a status register;

said command register including, a break bit that indicates a break and a fast break go bit that indicates a fast break;

said break bit in said command register when set causing a break during said emulation mode to exit emulation mode to invoke said monitor to enter said interrogation mode;

said second means including third means for registering a jump address to said predetermined ROM address to start execution of said code; and, a set of processor core registers in said emulation processor;

said processor core registers including a core command register connected to said command register, and a core status register connected to said status register;

said core command register receiving from said command register said jump address pointing to said predetermined ROM address;

said emulation processor executing only said first command upon a first condition that said fast break go bit is set;

said emulation processor executing said first command, modifying a content of said core status register to indicate that said first command has been executed, and executing said next command, upon a second condition that said fast break go bit is not set.

2. The emulation processor in accordance with claim 1 wherein in response to a break condition, an instruction pointer and a program status byte are saved in said memory and a content of said core status register are modified to indicate that said interrogation mode has been entered and upon said first condition that said fast break go bit is set, said instruction pointer and said program status byte are restored from said memory and said content of said core status register are cleared.

3. The emulation processor in accordance with claim 1 wherein said second means includes a core user tag register for receiving user tag information during said emulation mode, and a user tag valid bit, said emulation processor further comprising:

third means for invoking a writing to said user tag register provided that said user tag valid bit is not asserted; and, fourth means for transferring said user tag information from said core user tag register to said second means provided that said user tag valid bit is asserted.

4. An emulation processor operable in an interrogation mode and an emulation mode, said micro processor emulator including a test ROM and a memory, said emulation processor comprising:

a monitor including monitor code starting at a predetermined ROM address of said test ROM, said monitor code including at least a first command and a next command, said first command and said next command being executable in said interrogation mode;

a command register;

said command register storing a jump address;

a status register;

a fast break go bit;

a serial scan port; and, a set of core registers;

said processor core registers including a core command register connected to said command register, and a core status register connected to said status register;

said core command register receiving from said command register said jump address pointing to said predetermined ROM address;

said emulation processor executing only said first command upon a first condition that said fast break go bit is set;

said emulation processor executing said first command, modifying a content of said core status register to indicate that said first command has been executed, and executing said next command, upon a second condition that said fast break go bit is not set.

5. The emulation processor in accordance with claim 4 wherein said core status register includes a previous OK bit, said emulation processor invoking a transfer of said state information from said core status register to said serial scan port provided said previous OK bit is asserted.

6. The emulation processor in accordance with claim 4 wherein one of said core registers is a core user tag register for receiving user tag information during said emulation mode, said user tag register including a user tag valid bit, said emulation processor invoking a writing to said user tag register provided that said user tag valid bit is not asserted;

said emulation processor transferring said user tag information from said core user tag register to said serial scan port provided that said user tag valid bit is asserted.

7. In a emulation processor operable in an interrogation mode and an emulation mode, said emulation processor including a test ROM and a memory, a method comprising steps of:

A. providing executable code starting at a predetermined ROM address of said test ROM, said code including at least a first command and a next command, said first command and said next command being executable in said interrogation mode;

B. registering serially received information, said serially received information including a jump address to said predetermined ROM address to start execution of said executable code, said serially received information including a command, said command including a break bit and a fast break go bit;

C. setting said break bit to cause a break during said emulation mode to exit emulation mode to invoke said monitor to enter said interrogation mode;

D. sequentially executing said monitor code beginning at said jump address;

E. executing only said first command upon a first condition that said fast break go bit is set; and, F. executing said first command, modifying a content of said core status register to indicate that said first command has been executed, and executing said next command, upon a second condition that said fast break go bit is not set.

8. The method in accordance with claim 7 further comprising steps of:

G. providing a state register for receiving state information during said emulation mode, said state register including a previous OK bit; and, H. invoking a transfer of said state information provided said previous OK bit is asserted.

9. The method in accordance with claim 7 further comprising steps of:

G. providing a user tag register for receiving user tag information during said emulation mode, said user tag register including a user tag valid bit:

H. invoking a writing to said user tag register provided that said user tag valid bit is not asserted; and, I. transferring said user tag information from said user tag register provided that said user tag valid bit is asserted.

10. For use with an emulation processor operable in an interrogation mode and an emulation mode, said micro processor emulator including a test read only memory (ROM) and a memory, the combination comprising:

a monitor including monitor code starting at a predetermined ROM address of said test ROM, said monitor code including at least a first command and a next command, said first command and said next command being executable in said interrogation mode;

a serial scan port;

said serial scan port including a command register and a status register;

said command register including a break bit that indicates a break and a fast break go bit that indicates a fast break;

said break bit in said command register when set causing a break during said emulation mode to exit emulation mode to invoke said monitor to enter said interrogation mode; and, a set of processor core registers in said emulation processor;

said processor core registers including a core command register connected to said command register, and a core status register connected to said status register;

said core command register receiving from said command register a jump address pointing to said predetermined ROM address;

said emulation processor executing only said first command upon a first condition that said fast break go bit is set;

said emulation processor executing said first command, modifying a content of said core status register to indicate that said first command has been executed, and executing said next command, upon a second condition that said fast break go bit is not set.

11. The combination in accordance with claim 10 wherein, in response to a break condition, an instruction pointer and a program status byte are saved in said memory and a content of said core status register are modified to indicate that said interrogation mode has been entered and upon said first condition that said fast break go bit is set, said instruction pointer and said program status byte are restored from said memory and said content of said core status register are cleared.

12. The micro processor emulator in accordance with claim 10 wherein said serial scan port includes a user tag register and said set of core registers includes a core user tag register;

said user tag register including a user tag valid bit;

said emulation processor writing from said core user tag register to said user tag register upon a condition that said user tag valid bit is not asserted;

said emulation processor transferring said user tag information from said core user tag register to said user tag register upon a condition that said user tag valid bit is asserted.

13. In an emulation processor operable in an interrogation mode and an emulation mode, said micro processor emulator including a test read only memory (ROM) and a memory, a method comprising steps of:

A. providing executable code starting at a predetermined ROM address of said test ROM, said code including at least a first command and a next command, said first command and said next command being executable in said interrogation mode;

B. registering serially received information in a command register and a core status register, said serially received information including a jump address pointing to said predetermined ROM address, said serially received information including a command, said command including a break bit that indicates a break and a fast break go bit that indicates a fast break;

C. setting said break bit in said command register to cause a break during said emulation mode to exit emulation mode to invoke said monitor to enter said interrogation mode;

D. receiving from said command register said jump address pointing to said predetermined ROM address;

E. sequentially executing said monitor code beginning at said jump address;

F. executing only said first command upon a first condition that said fast break go bit is set; and, G. executing said first command, modifying a content of said core status register to indicate that said first command has been executed, and executing said next command, upon a second condition that said fast break go bit is not set.

14. The method in accordance with claim 13 further comprising steps of:

H. saving, in response to a break condition, an instruction pointer and a program status byte in said memory;

I. modifying a content of said core status register to indicate that said interrogation mode has been entered;

J. restoring said instruction pointer and said program status byte from said memory upon said first condition that said fast break go bit is set; and, K. clearing said content of said core status register.

15. The method in accordance with claim 13 further comprising steps of:

H. receiving, in a user tag register, user tag information during said emulation mode, said user tag information including a user tag valid bit:

I. writing from said core user tag register to said user tag register upon a condition that said user tag valid bit is not asserted; and, J. transferring said user tag information from said core user tag register to said user tag register upon a condition that said user tag valid bit is asserted.

* * * * *

UNITED STATES PATENT AND TRADEMARK OFFICE
CERTIFICATE OF CORRECTION

PATENT NO. : 5,497,456

DATED : March 5, 1996

INVENTOR(S): Alexander, et al.

It is certified that error appears in the above-identified patent and that said Letters Patent is hereby corrected as shown below:

Column 1, line 54, change "marchers" to --matchers--.

Signed and Sealed this

Twenty-fifth Day of June, 1996

Attest:

BRUCE LEHMAN

Attesting Officer

Commissioner of Patents and Trademarks